(12) United States Patent
Hsu et al.

(10) Patent No.: US 7,443,453 B2
(45) Date of Patent: Oct. 28, 2008

(54) DYNAMIC IMAGE SATURATION ENHANCEMENT APPARATUS

(75) Inventors: Kai-Hsiang Hsu, Tucheng (TW); Hsu-Hung Chen, Sanchung (TW); Hsu-Pin Kao, Pingjen (TW); Yi-Sheng Yu, Taoyuan (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 521 days.

(21) Appl. No.: 11/199,945

(22) Filed: Aug. 8, 2005

(65) Prior Publication Data

US 2006/0181741 A1    Aug. 17, 2006

(30) Foreign Application Priority Data

Feb. 15, 2005    (TW)    ............... 94104338 A

(51) Int. Cl.
  *H04N 9/68*    (2006.01)
  *H04N 5/14*    (2006.01)
  *H04N 5/52*    (2006.01)
(52) U.S. Cl. .................. 348/645; 348/672; 348/679
(58) Field of Classification Search ......... 348/645–647, 348/671, 672, 678, 679, 256; 382/162, 167, 382/168; 345/591, 600, 601, 603, 604; 358/518, 358/520, 522, 523; *H04N 9/68, 5/14, 5/52*
  See application file for complete search history.

(56) References Cited

U.S. PATENT DOCUMENTS

| 5,289,295 | A | * | 2/1994 | Yumiba et al. | ............... 358/518 |
| 5,337,083 | A | * | 8/1994 | Murata et al. | ............... 348/646 |
| 7,042,520 | B2 | * | 5/2006 | Kim | .................... 348/645 |
| 7,193,659 | B2 | * | 3/2007 | Huang et al. | ................. 348/645 |
| 2002/0167467 | A1 | | 11/2002 | Kao et al. | |

2004/0247199 A1    12/2004    Murai et al.

FOREIGN PATENT DOCUMENTS

| EP | 1 457 925 A1 | 9/2004 |
| JP | 6-124329 | 10/1992 |

(Continued)

OTHER PUBLICATIONS

Fumio Fujimura and Shinichi Takarada; Image Processor; 2000224607 A; Aug. 11, 2000; Patent Abstracts of Japan; Japanese Patent Office, Japan.

(Continued)

*Primary Examiner*—Sherrie Hsia
(74) *Attorney, Agent, or Firm*—Reed Smith LLP; Stanley P. Fisher, Esq.; Juan Carlos A. Marquez, Esq.

(57) ABSTRACT

The invention provides an apparatus for dynamically adjusting the saturation of an image signal consisting of a plurality of pixels. The apparatus includes a first transformation module, an operation module, a gain module, an adjustment module and a second transformation module. The first transformation module transforms the pixels of the image signal into a plurality of intermediate signals, where each of the intermediate signals has a respective saturation value. The intermediate signals are adjusted in accordance with a gain signal determined by a histogram relative to the saturation distribution of the intermediate signals. The adjusted intermediate signals are transformed back into the pixels of the image signal, thereby the saturation of the image signal is adjusted.

21 Claims, 6 Drawing Sheets

FOREIGN PATENT DOCUMENTS

| | | |
|---|---|---|
| JP | 6-124329 | 5/1994 |
| JP | 10-023279 | 6/1996 |
| JP | 10-283470 | 4/1997 |
| JP | 11-069181 | 8/1997 |
| JP | 10-023279 | 1/1998 |
| JP | 10-283470 | 10/1998 |
| JP | 2000-224607 | 1/1999 |
| JP | 11-69181 | 3/1999 |
| JP | 2001-230941 | 2/2000 |
| JP | 2000-224607 A | 8/2000 |
| JP | 2001-230941 | 8/2001 |
| JP | 2004-282377 | 3/2003 |
| JP | 2004-336714 | 3/2004 |
| JP | 2004-282377 | 10/2004 |
| JP | 2004-336714 | 11/2004 |
| TW | 514950 | 4/2001 |

OTHER PUBLICATIONS

Natsumi Ookubo; Image-Processing Unit; 10023279 A; Jan. 23, 1998; Patent Abstracts of Japan; Japanese Patent Office, Japan.

Takashi Endo; Saturation Varying Circuit; 06124329 A; May 6, 1994; Patent Abstracts of Japan; Japanese Patent Office, Japan.

Takahiro Sugawara and Noboru Inoue; Original Image Identifying Apparatus, Color Copying Machine, and Original Image Identifying Method; 2004336714 A; Nov. 25, 2004; Patent Abstracts of Japan; Japanese Patent Office, Japan.

Natsumi Miyazawa; Image Processing Unit; 11069181 A; Mar. 9, 1999; Patent Abstracts of Japan; Japanese Patent Office, Japan.

Kiyoaki Murai and Hidekuni Moriya; Image Processing Apparatus, Image Processing Method, and Image Processing Program; 2004-282377; Oct. 7, 2004; Patent Abstracts of Japan; Japanese Patent Office, Japan.

Masaru Okutsu; Device and Method for Processing Image and Computer-Readable Recording Medium With Recorded Image Processing Program; 2001230941 A; Aug. 24, 2001; Patent Abstracts of Japan; Japanese Patent Office, Japan.

Natsumi Ookubo; Image Processor, Image Processing Method and Recording Medium; 10283470 A; Oct. 23, 1998, Patent Abstracts of Japan; Japanese Patent Office, Japan.

* cited by examiner

DYNAMIC IMAGE SATURATION ENHANCEMENT APPARATUS

BACKGROUND OF THE INVENTION

1. Field of the Invention

This present invention relates generally to a dynamic image enhancement apparatus, and more particularly, to an apparatus for dynamically adjusting the saturation values of an image signal.

2. Description of the Prior Art

The natural way that human eyes perceive and respond to a color is based on hue, saturation and brightness. RGB color signals can be represented as two parts of luma (luminance or brightness) and chroma (the dominant color and its saturation). For processing image signals in a display device, luma-chroma separation is usually performed on the image signals first so as to enable us to adjust each component individually. When transmitting high-quality image signals, the brightness and color components are also separated and maintained individually, e.g. the YPbPr and YCbCr color spaces used in video and image compression. To enhance the saturation of image signals, one can adjust the Pb and Pr (Cb and Cr) components, i.e., the color component of the signal, to achieve this goal.

After displaying devices (e.g. monitors) are manufactured, users can make use of the OSD (On Screen Display) functionality built in the devices to change the default displaying settings, such as saturation, so as to further enhance the picture quality and obtain more vivid visual display. However, the same displaying settings usually are not suitable for all images. For example, raising the saturation of one image might cause another image originally with high saturation to be oversaturated, and vice versa. This scenario is often harmful to the visual effects presented by monitors.

By using the OSD controlling, users can easily configure the monitors to display images in their desired ways. However, the static settings cannot adapt to the dynamic changes occurred in a video sequence, causing the aforementioned problem. There is therefore a need for an apparatus that provides for automatic adjustment of saturation based on various image signals. Besides, there is also the possibility to accomplish the adjustment task in color spaces other than the widely used YPbPr and YCbCr, such as CIE Lab. The benefits of using CIE Lab include that the luma and chroma components of a color are well separated. Also, color data stored in CIE Lab representation can convert between different color spaces without loss of information.

Accordingly, an objective of the invention is to provide an apparatus for dynamically adjusting the saturation of an image signal.

SUMMARY OF THE INVENTION

The objective of the invention is to provide a dynamic image enhancement apparatus for automatically adjusting the saturation of an image signal.

According to the first preferred embodiment of the invention, the apparatus, for dynamically adjusting the saturation of an image signal consisting of a plurality of pixels, includes a first transformation module, an operation module, a gain module, an adjustment module and a second transformation module. The first transformation module is used to receive the image signal, and transform the pixels of the image signal into a plurality of intermediate signals, where each of the intermediate signals has a respective saturation value. The operation module, electrically connected to the first transformation module, is used to receive the intermediate signals, and generate, based on the intermediate signals, an operational signal. The gain module, electrically connected to the operation module, is used to receive the operational signal, and generate, according to the operational signal, a gain signal. The adjustment module, electrically connected to the gain module and the first transformation module respectively, is used to receive the gain signal and the intermediate signals, and adjust, according to the gain signal, the saturation value of each of the intermediate signals. The second transformation module, electrically connected to the adjustment module, is used to receive the adjusted intermediate signals, and transform the adjusted intermediate signals back into the pixels of the image signal, thereby the saturation of the image signal is adjusted.

According to the second preferred embodiment of the invention, the apparatus, for dynamically adjusting the saturation of an image signal consisting of a plurality of pixels, includes a first transformation module, an operation/gain module, an adjustment module and a second transformation module. The operation/gain module includes an operation module and a gain module. The first transformation module, is used to receive the image signal, and transform the pixels of the image signal into a plurality of intermediate signals, where each of the intermediate signals has a respective saturation value. The operation module, electrically connected to the first transformation module, is used to receive the intermediate signals, and generate, based on the intermediate signals, an operational signal. The gain module, electrically connected to the operation module, is used to receive the operational signal, and generate, according to the operational signal, the gain signal. The adjustment module, electrically connected to the gain module and the first transformation module respectively, is used to receive the gain signal and the intermediate signals, and adjust, according to the gain signal, the saturation value of each of the intermediate signals. The second transformation module, electrically connected to the adjustment module, is used to receive the adjusted intermediate signals, and transform the adjusted intermediate signals back into the pixels of the image signal, thereby the saturation of the image signal is adjusted.

According to the third preferred embodiment of the invention, a method is provided for dynamically adjusting the saturation of an image signal consisting of a plurality of pixels. Thereinafter the steps of the method are summarized briefly. Firstly, the image signal is received and the pixels of the image signal are transformed into a plurality of intermediate signals, where each of the intermediate signals has a respective saturation value. Secondly, an operational signal is generated based on the intermediate signals. Thirdly, a gain signal is generated according to the operational signal. Afterwards, the saturation value of each of the intermediate signals is adjusted in accordance with the gain signal. Finally, the adjusted intermediate signals are transformed back into the pixels of the image signal, and thereby the saturation of the image signal is adjusted.

More specifically, the apparatus and method of the invention calculates a histogram relative to the saturation distribution of the image signal, and generates a gain signal for the image signal. The gain signal is then applied to adjust the saturation of the image signal. The invention is capable of adjusting the saturation of image signals automatically such that the image quality is further enhanced.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
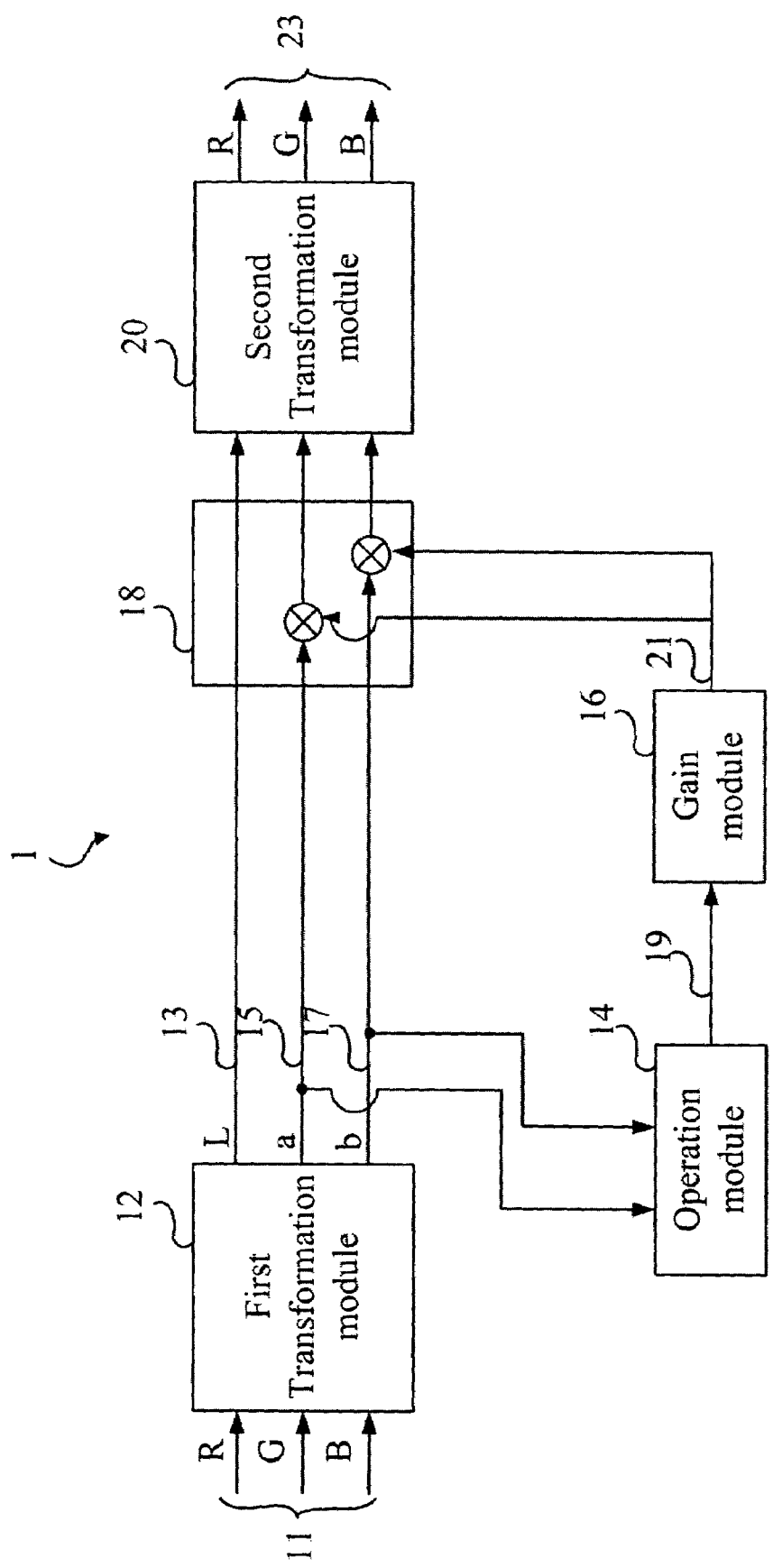
FIG. 1 is a functional block diagram of the dynamic image enhancement apparatus according to a preferred embodiment of the invention.

Referring to FIG. 1, FIG. 1 illustrates a functional block diagram of the dynamic image enhancement apparatus according to the first preferred embodiment of the invention. The invention provides an apparatus 1 for dynamically adjusting the saturation of an image signal 11 consisting of a plurality of pixels. The apparatus 1 includes a first transformation module 12, an operation module 14, a gain module 16, an adjustment module 18 and a second transformation module 20.

The first transformation 12 receives the image signal 11 and transforms the pixels of the image signal 11 into a plurality of intermediate signals, where each of the intermediate signals has a respective saturation value.

In an embodiment, each of the intermediate signals includes a brightness component 13, a first color component 15 and a second color component 17. The saturation value of each of the intermediate signals is defined by the first color component 15 and the second color component 17.

The operation module 14, electrically connected to the first transformation module 12, receives the intermediate signals, and generates, based on the intermediate signals, an operational signal 19. Specifically, the operation module 14 calculates a histogram relative to the saturation values of the intermediate signals, and then generates the operational signal 19 in accordance with the distribution of saturation values of the intermediate signals in the histogram.

In an embodiment, the saturation value of each of the intermediate signals is defined as the sum of the absolute values of the first color component 15 and the second color component 17. In another embodiment, the saturation value of each of the intermediate signals is defined as the sum of the square values of the first color component 15 and the second color component 17.

The gain module 16, electrically connected to the operation module 14, receives the operational signal 19, and generates, according to the operational signal 19, a gain signal 21. In an embodiment, the gain module 16 includes a look-up table (LUT, not shown in FIG. 1), and generates the gain signal 21 in accordance with the operational signal 19 and the look-up table. In another embodiment, the gain module 16 has a buffer (not shown in FIG. 1) for storing a plurality of reference gain signals associated with a plurality of previous image signals, and the gain module 16 generates the gain signal in accordance with the operational signal and the reference gain signals.

The adjustment module 18, electrically connected to the gain module 16 and the first transformation module 12 respectively, receives the gain signal 21 and the intermediate signals, and adjusts, according to the gain signal 21, the saturation value of each of the intermediate signals.

The second transformation module 20, electrically connected to the adjustment module 18, for receiving the adjusted intermediate signals, and transforming the adjusted intermediate signals back into the pixels of the image signal 11, thereby the saturation of the image signal 11 is adjusted.

In an embodiment, the image signal 11 is represented as the commonly used RGB representation. For the adjustment of image saturation, the pixels of the image signal 11 are firstly corrected in a gamma adjust transformation of 2.2 by querying a gamma look-up table, and then transformed into the intermediate signals in the form of the CIE Lab representation. Taking advantage of the separation of luma and chroma components in the CIE Lab color space, the apparatus 1 calculates a histogram relative to the saturation distribution of the intermediate signals and generates the operational signal 19. The gain signal 21 is then generated by querying the LUT in accordance with the operational signal 19. The gain signal 21 is applied to adjust the first color component 15 and the second color component 17 of the intermediate signal. An inverse transformation is performed to restore the adjusted intermediate signals to RGB representation, and thereby the adjustment of image saturation is accomplished.

Figure 2A:
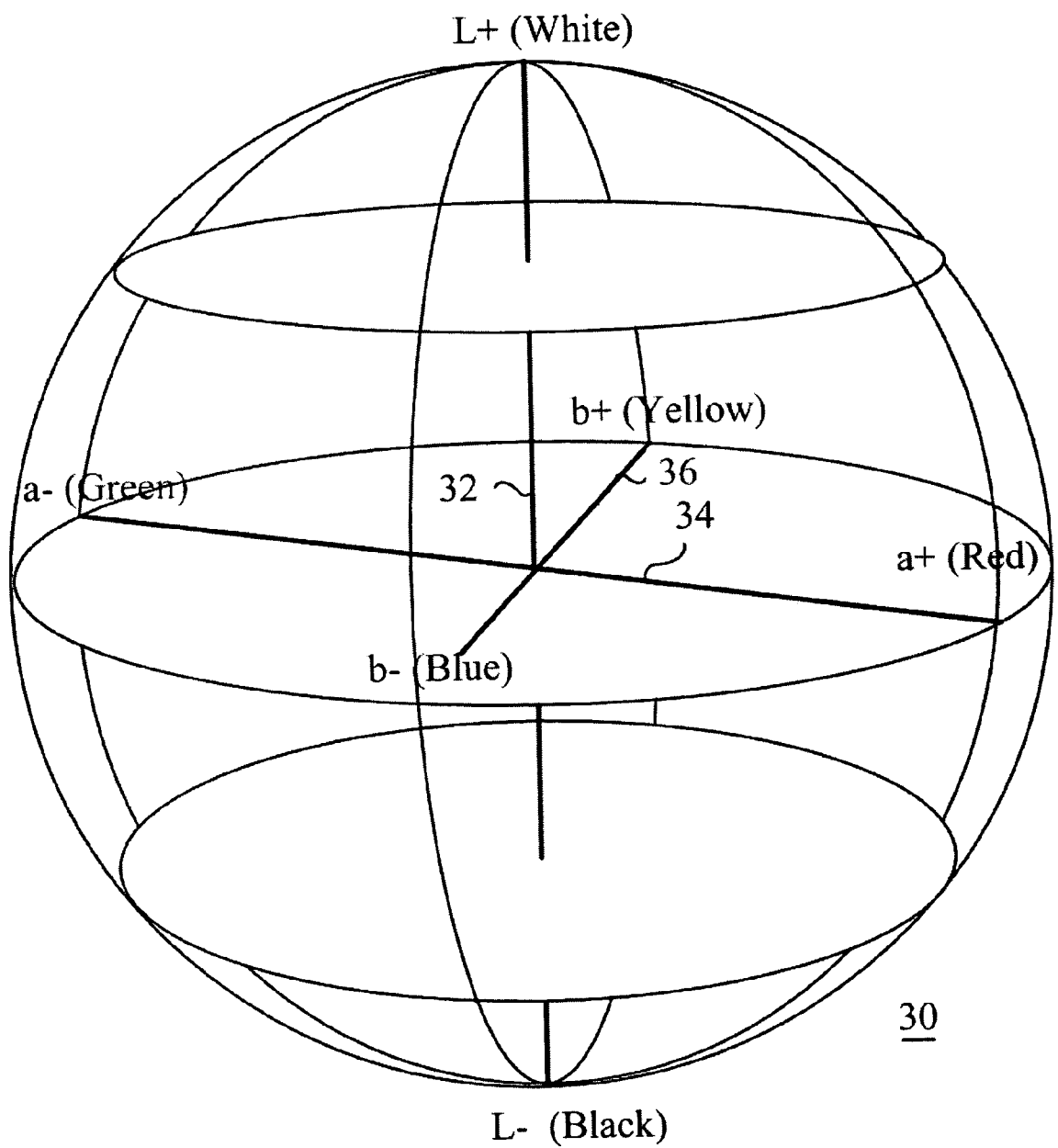
FIG. 2A shows schematically the CIE Lab color space.

Please refer to FIG. 2A through FIG. 3B. FIG. 2A is a schematic diagram illustrating the CIE Lab color space. As shown in FIG. 2A, the CIE Lab is a three dimensional color space defined by the axis of L 32, the axis of a 34 and the axis of b 36. By definition, L represents the brightness component and (a, b) represent the color components, where a further represents the colors of red and green, and b represents the colors of blue and yellow. The L, a, b correspond to the brightness signal, and the first color component 15 and the second color component 17 of the intermediate signals, respectively.

Figure 2B:
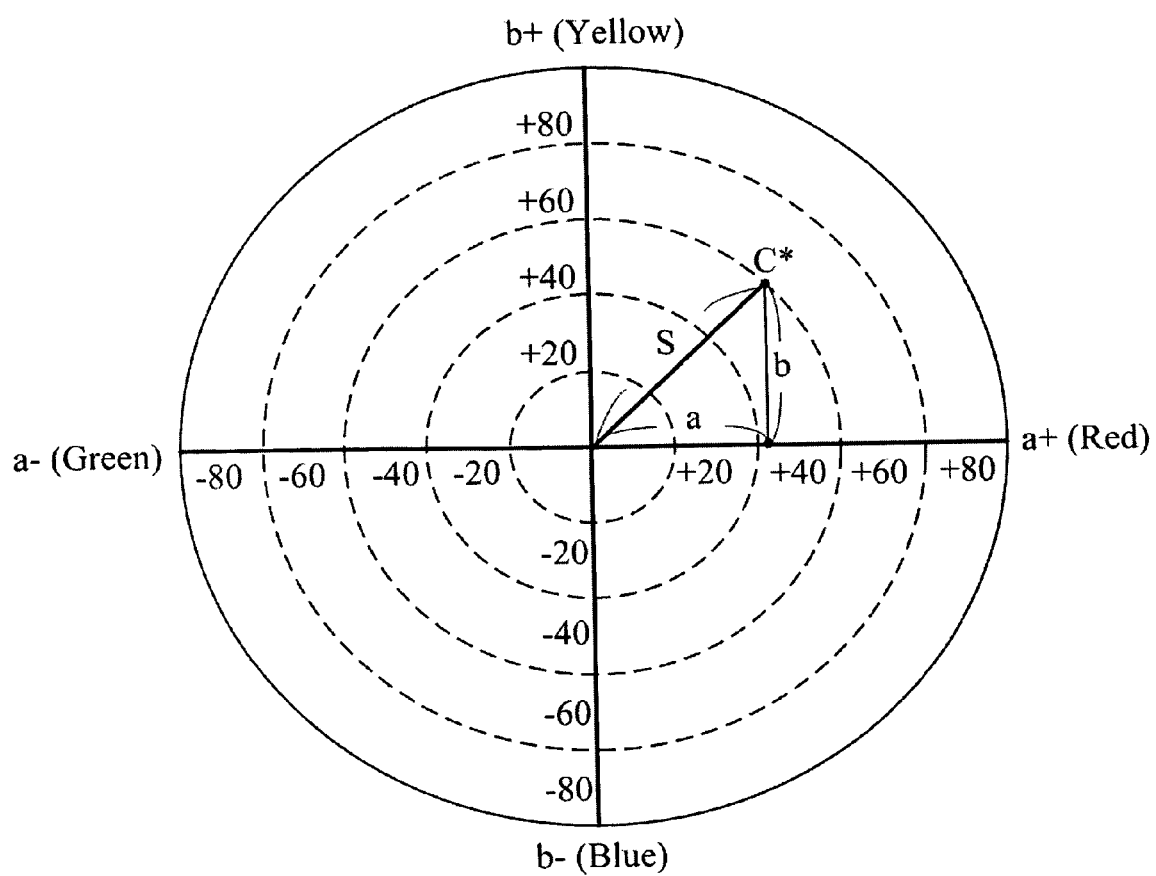
FIG. 2B is a cross-sectional view of the CIE Lab color space along the L axis.

FIG. 2B shows a cross-sectional view of the CIE Lab color space along the L axis. Every coordinate in the CIE Lab color space defines a distinct color. If both a and b equal to zero simultaneously, different L coordinates correspond to white colors of various brightness. As shown in FIG. 2B, a plane of fixed L in the color space is illustrated. In other words, the plane is a collection of all colors with equivalent brightness in the color space. As a point C* on the color plane approaches the original, the corresponding colors vary from fully saturated (no white component) to unsaturated. As a result, the saturation of a point on the color plane could be defined as its distance to the original:

$$S = \sqrt{a^2 + b^2};$$

Figure 3B:
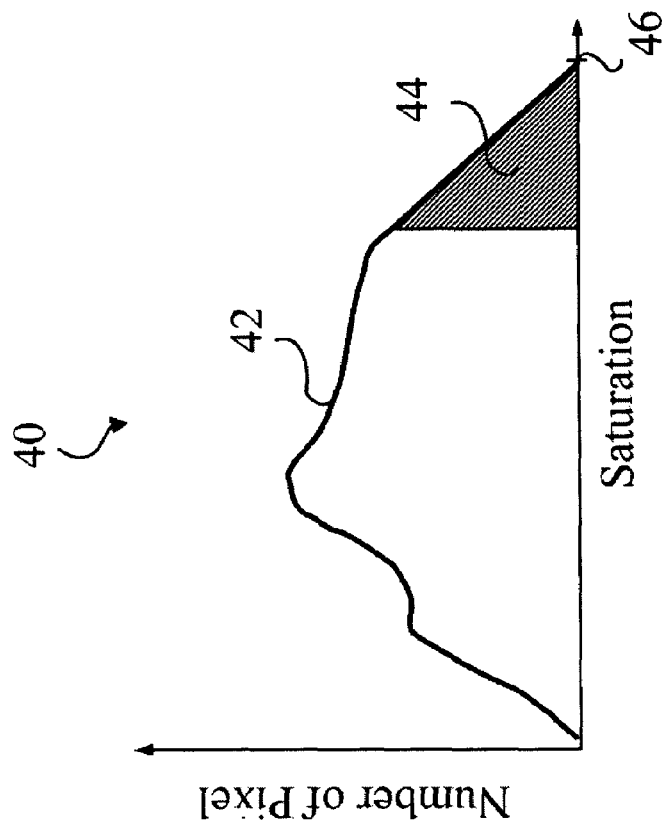
FIG. 3B is the exemplary saturation histogram of shown in FIG. 3A, which demonstrates the procedure of determining the saturation index.
Figure 3A:
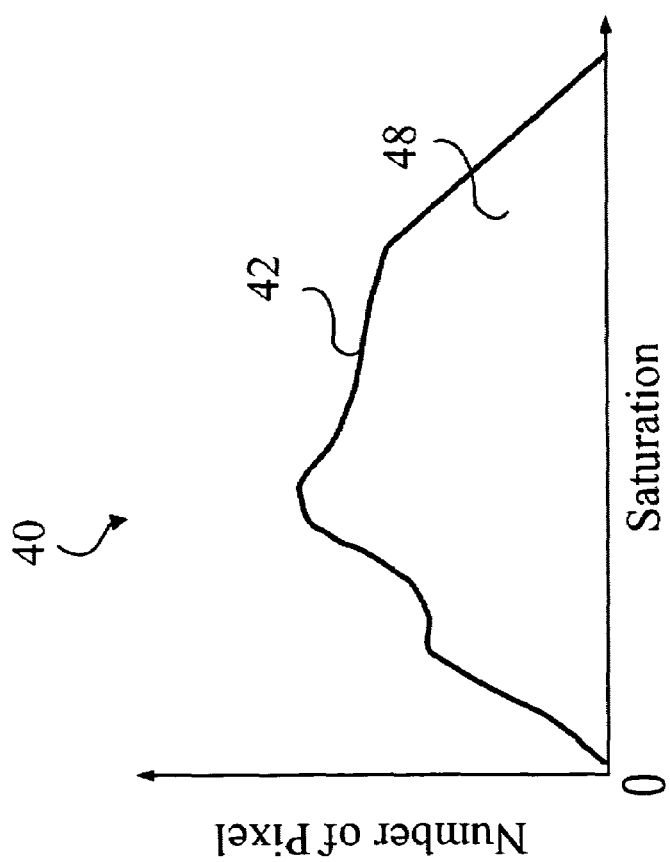
FIG. 3A illustrates an exemplary saturation histogram of an image signal according to an embodiment of the invention.

By defining the measure of saturation, a histogram 40 relative to the saturation values of the intermediate signals, as shown in FIG. 3A and FIG. 3B, can be calculated according to the color components of the intermediate signals. In an embodiment, the histogram 40 is calculated in accordance with the square values of a and b because of the higher computational cost of square roots. In another embodiment, the saturation of a color is approximated by the absolute values of a and b, i.e. $S=|a|+|b|$, to calculate the histogram 40.

In practical applications, the characteristic of the saturation histogram 40 computed from an entire image can be retained by sub-sampling, such as selecting one out of eight pixels in a row and selecting one out of four rows in an image. Without computations for the saturation values of all pixels, the computational cost is significantly reduced.

The saturation histogram 40 indicates the numbers of pixels with various saturation values, i.e. the distribution of saturation values in an image. In an embodiment, taking advantage of the curve 42 of the histogram 40, the operational signal 19 is determined by the following procedure. As shown in FIG. 3B, let the maximum value of saturation be S_max and S_index be any possible saturation values ranging from 0 to S_max. Starting with S_index equal to S_max, the operation module 14 calculates the local area (Area_local) 44 of the region bounded above by the curve 42, bounded below by the S-axis, bounded to the left by S_index, and bounded to the right by S_max. Then, the operation module 14 determines if the ratio of Area_local 44 to the global area 48 under the curve 42 is greater than or equal to a predetermined threshold. If the ratio is less than the threshold, S_index is decremented by one and Area_local 44 is recalculated. Repeat the above step until the criterion is satisfied and output S_index as the operational signal 19.

Each of the possible saturation indexes S_index has a corresponding entry in the LUT, which contains a predetermined value of gain for S_index. By querying the LUT with the index determined by the operation module 14, the corresponding value of gain can be retrieved easily and then outputted as the gain signal 21. The saturation of the intermediate signals is adjusted by multiplying the first color component 15 and the second color component 17 by the gain signal 21. The adjusted intermediate signals are transformed back into RGB representation, and thereby the saturation adjustment of the image signal 11 is finished.

The gain module 16 receives the operational signal 19, and generates the gain signal 21 by querying the LUT with the operational signal 19 (i.e. the saturation index). The adjustment module 18 adjusts the saturation value of each of the intermediate signals in accordance with the gain signal 21. Then, the second transformation module 20 transforms the adjusted intermediate signals back into the pixels of the image signal 11, thereby the saturation of the image signal 11 is adjusted.

In an embodiment of the apparatus 1 according to the invention, the gain module 16 has a buffer for storing a plurality of reference gain signals associated with a plurality of previous image signals, and the gain module 16 generates the gain signal 21 in accordance with the operational signal 19 and the reference gain signals. In general, the changes between adjacent frames in a video sequence are insignificant, especially in a rate of 60 f/sec. Considering also the process time needed by the hardware, the saturation adjustment of the current frame can adopt the gains computed for previous frames. However, adjusting the current frame by only referring to the gain of the previous frame often causes flicker when displaying a continuous video sequence. As a result, a smoothed gain is obtained by calculating the average gain of a certain number of previous frames, e.g. 30 frames, to avoid the flicker caused by abrupt change in saturation between continuous image signals. Also, the gain module generates the gain for the current frame in accordance with the operational signal 19, and pushes it into the buffer.

Figure 4:
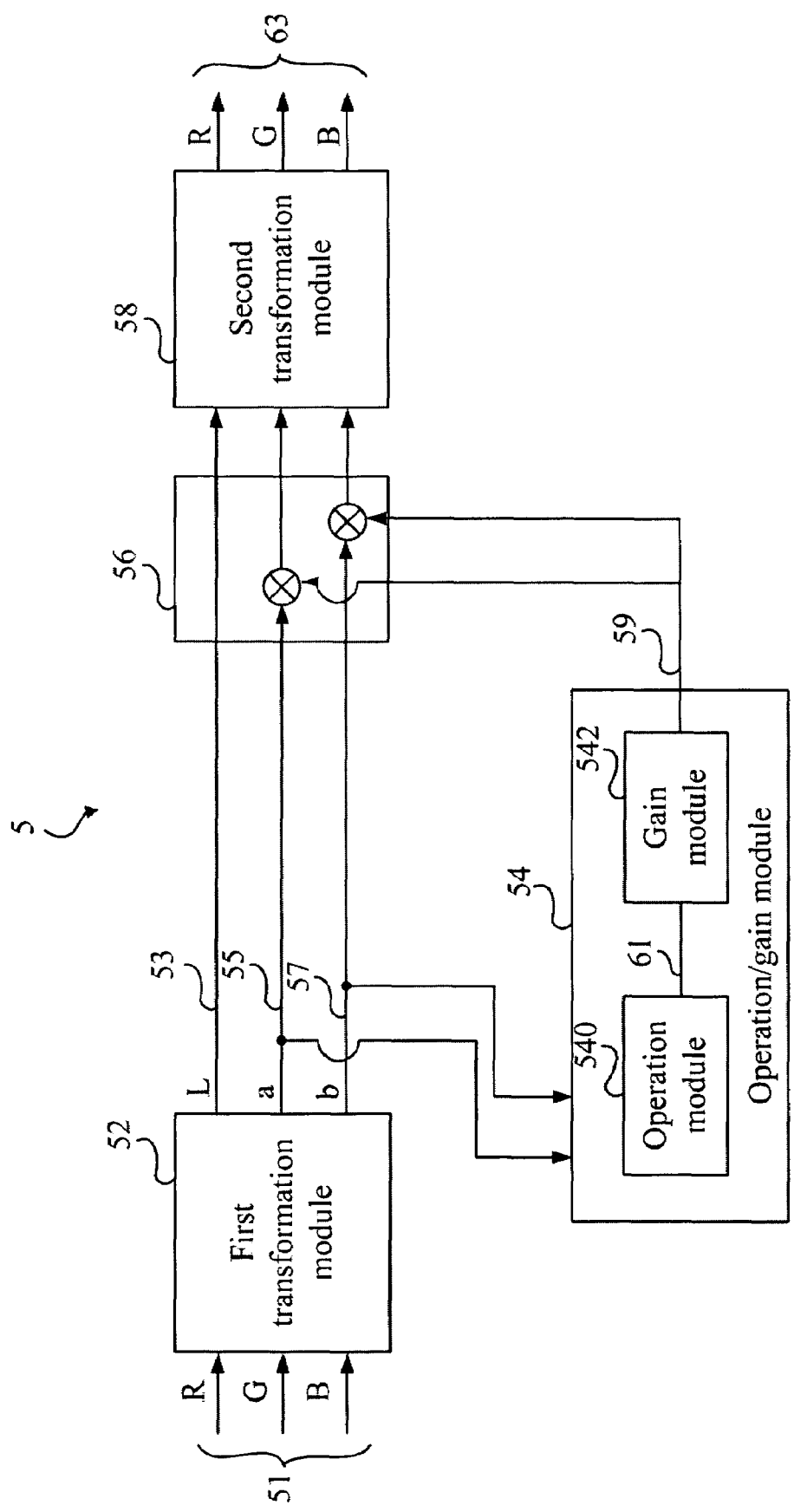
FIG. 4 is a functional block diagram of the dynamic image enhancement apparatus according to a preferred embodiment of the invention.

Referring to FIG. 4, FIG. 4 illustrates a functional block diagram of the dynamic image enhancement apparatus 5 according to the second preferred embodiment of the invention. The apparatus 5, for dynamically adjusting the saturation of an image signal 51 consisting of a plurality of pixels, includes a first transformation module 52, an operation/gain module 54, an adjustment module 56 and a second transformation module 58. The operation/gain module 54 includes an operation module 540 and a gain module 542.

The first transformation module 52 receives the image signal 51 and transforms the pixels of the image signal 51 into a plurality of intermediate signals, where each of the intermediate signals has a respective saturation value.

In an embodiment, each of the intermediate signals includes a brightness component 53, a first color component 55 and a second color component 57. The saturation value of each of the intermediate signals is defined by the first color component 55 and the second color component 57.

The operation module 540, electrically connected to the first transformation module 52, receives the intermediate signals and generates, based on the intermediate signals, an operational signal 61. Specifically, the operation module 540 calculates a histogram relative to the saturation values of the intermediate signals, and then generates the operational signal 61 in accordance with the distribution of saturation values of the intermediate signals in the histogram.

In an embodiment, the saturation value of each of the intermediate signals is defined as the sum of the absolute values of the first color component 55 and the second color component 57. In another embodiment, the saturation value of each of the intermediate signals is defined as the sum of the square values of the first color component 55 and the second color component 57.

The gain module 542, electrically connected to the operation module 540, receives the operational signal 61, and generates, according to the operational signal 61, the gain signal 59. In an embodiment, the gain module 542 includes a look-up table (not shown in FIG. 4) and generates the gain signal 59 in accordance with the operational signal 61 and the look-up table. In another embodiment, the gain module 542 has a buffer (not shown in FIG. 4) for storing a plurality of reference gain signals associated with a plurality of previous image signals, and the gain module 542 generates the gain signal 59 in accordance with the operational signal 61 and the reference gain signals.

The adjustment module 56, electrically connected to the gain module 542 and the first transformation module 52 respectively, receives the gain signal 59 and the intermediate signals, and adjusts, according to the gain signal 59, the saturation value of each of the intermediate signals.

The second transformation module 58, electrically connected to the adjustment module 56, receives the adjusted intermediate signals, and transforms the adjusted intermediate signals back into the pixels of the image signal 51, thereby the saturation of the image signal 51 is adjusted.

Figure 5:
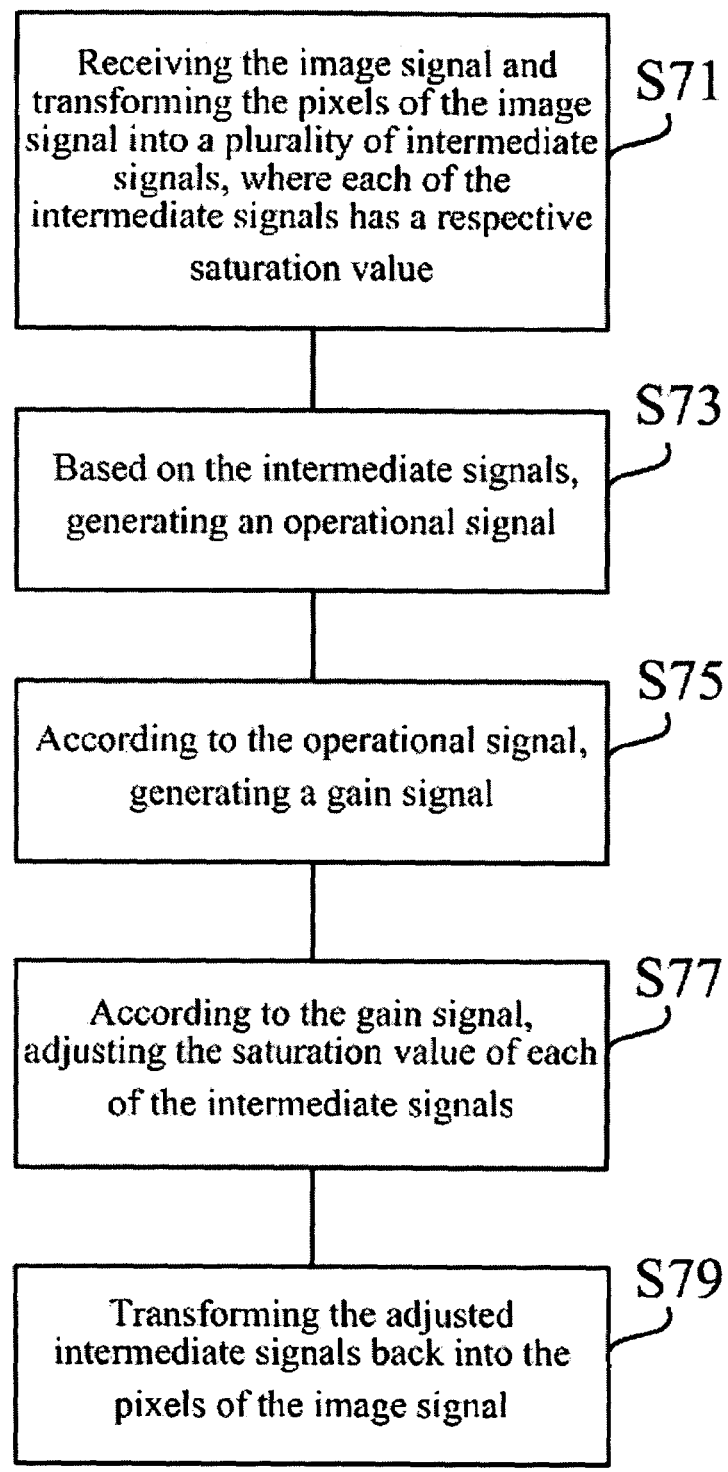
FIG. 5 is a flowchart of the dynamic image enhancement method according to a preferred embodiment of the invention.

Referring to FIG. 5, FIG. 5 is a flowchart of the dynamic image enhancement method according to the third preferred embodiment of the invention. The method is used to dynamically adjust the saturation of an image signal consisting of a plurality of pixels. Thereinafter the steps of the method according to the invention are described in detail.

Initially, step S71 is performed to receive the image signal and transform the pixels of the image signal into a plurality of intermediate signals, where each of the intermediate signals has a respective saturation value.

In an embodiment, each of the intermediate signals comprises a brightness component, a first color component and a second color component. The saturation value of each of the intermediate signals is defined by the first color component and the second color component.

Next, step S73 is performed to generate an operational signal based on the intermediate signals. Specifically, step S73 calculates a histogram relative to the saturation values of the intermediate signals, and then generates the operational signal in accordance with the distribution of saturation values of the intermediate signals in the histogram.

In an embodiment, the saturation value of each of the intermediate signals is defined as the sum of the absolute values of the first color component and the second color component. In another embodiment, the saturation value of each of the intermediate signals is defined as the sum of the square values of the first color component and the second color component.

Afterwards, a gain signal is generated in accordance with the operational signal (step S75). In an embodiment, step S75 generates the gain signal in accordance with the operational signal and a look-up table. In another embodiment, step S75 generates the gain signal in accordance with the operational signal and a plurality of reference gain signals associated with a plurality of previous image signals.

According to the gain signal generated in step S75, the saturation value of each of the intermediate signals is adjusted (step S77). Finally, step S79 is performed to transform the adjusted intermediate signals back into the pixels of the image signal and thereby the saturation of the image signal is adjusted.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for dynamically adjusting a saturation of an image signal consisting of a plurality of pixels, said apparatus comprising:
   a first transformation module, for receiving the image signal, and transforming the pixels of the image signal into a plurality of intermediate signals, wherein each of the intermediate signals has a respective saturation value;
   an operation module, electrically connected to the first transformation module, for receiving the intermediate signals, calculating a histogram relative to the saturation values of the intermediate signals, and then generating an operational signal in accordance with the distribution of saturation values of the intermediate signals in the histogram;
   a gain module, electrically connected to the operation module, for receiving the operational signal, and generating, according to the operational signal, a gain signal;
   an adjustment module, electrically connected to the gain module and the first transformation module respectively, for receiving the gain signal and the intermediate signals, and adjusting, according to the gain signal, the saturation value of each of the intermediate signals; and
   a second transformation module, electrically connected to the adjustment module, for receiving the adjusted intermediate signals, and transforming the adjusted intermediate signals back into the pixels of the image signal;
   whereby the saturation of the image signal is adjusted.

2. The apparatus of claim 1, wherein each of the intermediate signals comprises a brightness component, a first color component and a second color component.

3. The apparatus of claim 2, wherein the saturation value of each of the intermediate signals is defined by the first color component and the second color component.

4. The apparatus of claim 2, wherein the saturation value of each of the intermediate signals is defined as the sum of the absolute values of the first color component and the second color component.

5. The apparatus of claim 2, wherein the saturation value of each of the intermediate signals is defined as the sum of the square values of the first color component and the second color component.

6. The apparatus of claim 1, wherein the gain module comprises a look-up table and generates the gain signal in accordance with the operational signal and the look-up table.

7. The apparatus of claim 1, wherein the gain module has a buffer for storing a plurality of reference gain signals associated with a plurality of previous image signals, and the gain module generates the gain signal in accordance with the operational signal and the reference gain signals.

8. An apparatus for dynamically adjusting a saturation of an image signal consisting of a plurality of pixels, said apparatus comprising:
   a first transformation module, for receiving the image signal, and transforming the pixels of the image signal into a plurality of intermediate signals, wherein each of the intermediate signals has a respective saturation value;
   an operation module, electrically connected to the first transformation module, for receiving the intermediate signals, and generating, based on the intermediate signals, an operational signal;
   a gain module, electrically connected to the operation module, for receiving the operational signal, the gain module comprising a buffer for storing a plurality of reference gain signals associated with a plurality of previous image signals, and the gain module generating a gain signal in accordance with the operational signal and the reference gain signals;
   an adjustment module, electrically connected to the gain module and the first transformation module respectively, for receiving the gain signal and the intermediate signals, and adjusting, according to the gain signal, the saturation value of each of the intermediate signals; and
   a second transformation module, electrically connected to the adjustment module, for receiving the adjusted intermediate signals, and transforming the adjusted intermediate signals back into the pixels of the image signal;
   whereby the saturation of the image signal is adjusted.

9. The apparatus of claim 8, wherein each of the intermediate signals comprises a brightness component, a first color component and a second color component.

10. The apparatus of claim 9, wherein the saturation value of each of the intermediate signals is defined by the first color component and the second color component.

11. The apparatus of claim 10, wherein the operation module calculates a histogram relative to the saturation values of the intermediate signals, and then generates the operational signal in accordance with the distribution of saturation values of the intermediate signals in the histogram.

12. The apparatus of claim 9, wherein the saturation value of each of the intermediate signals is defined as the sum of the absolute values of the first color component and the second color component.

13. The apparatus of claim 9, wherein the saturation value of each of the intermediate signals is defined as the sum of the square values of the first color component and the second color component.

14. The apparatus of claim 8, wherein the gain module comprises a look-up table and generates the gain signal in accordance with the operational signal and the look-up table.

15. A method for dynamically adjusting a saturation of an image signal consisting of a plurality of pixels, said method comprising the steps of:
- (a) receiving the image signal and transforming the pixels of the image signal into a plurality of intermediate signals, wherein each of the intermediate signals has a respective saturation value;
- (b) calculating a histogram relative to the saturation values of the intermediate signals and then generating an operational signal in accordance with the distribution of saturation values of the intermediate signals in the histogram;
- (c) according to the operational signal, generating a gain signal;
- (d) according to the gain signal, adjusting the saturation value of each of the intermediate signals; and
- (e) transforming the adjusted intermediate signals back into the pixels of the image signal;

whereby the saturation of the image signal is adjusted.

16. The method of claim 15, wherein each of the intermediate signals comprises a brightness component, a first color component and a second color component.

17. The method of claim 16, wherein the saturation value of each of the intermediate signals is defined by the first color component and the second color component.

18. The method of claim 16, wherein the saturation value of each of the intermediate signals is defined as the sum of the absolute values of the first color component and the second color component.

19. The method of claim 16, wherein the saturation value of each of the intermediate signals is defined as the sum of the square values of the first color component and the second color component.

20. The method of claim 15, wherein step (c) generates the gain signal in accordance with the operational signal and a look-up table.

21. The method of claim 15, wherein step (c) generates the gain signal in accordance with the operational signal and a plurality of reference gain signals associated with a plurality of previous image signals.

* * * * *